(12) United States Patent
Bayomi et al.

(10) Patent No.: US 11,995,114 B2
(45) Date of Patent: May 28, 2024

(54) NATURAL LANGUAGE PROCESSING OPERATIONS PERFORMED ON MULTI-SEGMENT DOCUMENTS

(71) Applicant: Optum Services (Ireland) Limited, Dublin (IE)

(72) Inventors: Mostafa Bayomi, Dublin (IE); Ahmed Selim, Dublin (IE); Kieran O'Donoghue, Dublin (IE); Michael Bridges, Dublin (IE); Gregory J. Boss, Saginaw, MI (US)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 17/454,353

(22) Filed: Nov. 10, 2021

(65) Prior Publication Data
US 2023/0145463 A1    May 11, 2023

(51) Int. Cl.
*G06F 16/34* (2019.01)
*G06F 40/166* (2020.01)
*G06N 20/00* (2019.01)

(52) U.S. Cl.
CPC .......... *G06F 16/345* (2019.01); *G06F 40/166* (2020.01); *G06N 20/00* (2019.01)

(58) Field of Classification Search
CPC .................................................. G06F 16/345
See application file for complete search history.

(56) References Cited

U.S. PATENT DOCUMENTS

| | | | | |
|---|---|---|---|---|
| 5,838,323 | A * | 11/1998 | Rose ...................... | G06F 16/345 715/236 |
| 8,650,483 | B2 * | 2/2014 | Liu ....................... | G06F 16/345 715/254 |
| 9,390,086 | B2 | 7/2016 | Lisuk et al. | |
| 9,826,285 | B1 * | 11/2017 | Mishra ................... | G06V 20/41 |
| 9,916,538 | B2 | 3/2018 | Zadeh et al. | |
| 10,489,502 | B2 | 11/2019 | Priestas et al. | |
| 10,572,726 | B1 * | 2/2020 | Jang ..................... | G06F 16/9558 |
| 10,909,313 | B2 | 2/2021 | Can et al. | |

(Continued)

FOREIGN PATENT DOCUMENTS

WO    2021/087320 A1    5/2021

OTHER PUBLICATIONS

"Medical Record Summarization," IME Services Company—Seyyone, (2 pages), (article, online), [Retrieved from the Internet Aug. 23, 2021] <URL: https://www.seyyone.com/medical-summarization/#:~:text=Seyyone%20provides%20a%20well%2Ddesigned,documents%20for%20any%20legal%20professional.

*Primary Examiner* — Asher D Kells

(74) *Attorney, Agent, or Firm* — Alston & Bird LLP

(57) ABSTRACT

Various embodiments of the present invention provide methods, apparatus, systems, computing devices, computing entities, and/or the like for performing natural language processing (NLP) operations on multi-segment documents. For example, certain embodiments of the present invention utilize systems, methods, and computer program products that perform NLP operations on multi-segment documents by generating document segmentation machine learning models, using document segmentation machine learning models to determine document segments of input multi-segment documents, enabling adaptive multi-segment summarization of multi-segment documents, and enabling guided interaction with multi-segment documents.

20 Claims, 10 Drawing Sheets

(56) References Cited

U.S. PATENT DOCUMENTS

| | | |
|---|---|---|
| 11,030,697 B2 | 6/2021 | Erard et al. |
| 2002/0080196 A1* | 6/2002 | Bornstein ............. G06F 16/345 715/854 |
| 2004/0117725 A1* | 6/2004 | Chen ..................... G06F 40/289 715/254 |
| 2004/0117740 A1* | 6/2004 | Chen ............................ 715/210 |
| 2004/0122657 A1* | 6/2004 | Brants .................. G06F 40/131 704/9 |
| 2005/0091203 A1* | 4/2005 | Liu ........................ G06F 16/345 |
| 2008/0104506 A1* | 5/2008 | Farzindar .............. G06F 16/345 707/999.1 |
| 2009/0083027 A1* | 3/2009 | Hollingsworth ...... G06F 40/284 704/9 |
| 2012/0066197 A1* | 3/2012 | Rana ....................... G06F 16/93 707/706 |
| 2014/0101527 A1* | 4/2014 | Suciu .................... G06F 40/169 715/230 |
| 2014/0172456 A1* | 6/2014 | Qian ..................... G06F 40/237 705/3 |
| 2016/0210426 A1 | 7/2016 | Robinson et al. |
| 2017/0060826 A1* | 3/2017 | Das ....................... G06F 16/345 |
| 2017/0228457 A1* | 8/2017 | Billawal ................. G06F 40/35 |
| 2018/0075139 A1* | 3/2018 | Sadovsky ............. G06N 20/20 |
| 2018/0225258 A1 | 8/2018 | Alba et al. |
| 2020/0210521 A1* | 7/2020 | Hutchins ............... G06F 16/986 |
| 2020/0293528 A1 | 9/2020 | Jonassen et al. |
| 2020/0334416 A1 | 10/2020 | Vianu et al. |
| 2020/0342221 A1 | 10/2020 | Sampath et al. |
| 2021/0011937 A1* | 1/2021 | Boni ..................... G06F 16/322 |
| 2021/0081495 A1 | 3/2021 | Hook et al. |
| 2021/0090694 A1 | 3/2021 | Colley et al. |
| 2021/0110912 A1 | 4/2021 | Mukherjee |
| 2021/0248268 A1 | 8/2021 | Ardhanari et al. |
| 2021/0350229 A1* | 11/2021 | Saleh .................... G06F 40/284 |
| 2022/0215274 A1* | 7/2022 | Mattivi ................. G06N 20/00 |
| 2023/0027310 A1* | 1/2023 | Muralidharan ....... G06F 40/166 |

\* cited by examiner

FIG. 10

NATURAL LANGUAGE PROCESSING OPERATIONS PERFORMED ON MULTI-SEGMENT DOCUMENTS

BACKGROUND

Various embodiments of the present invention address technical challenges related to performing natural language processing (NLP) operations and address the efficiency and reliability shortcomings of existing NLP solutions.

BRIEF SUMMARY

In general, embodiments of the present invention provide methods, apparatus, systems, computing devices, computing entities, and/or the like for performing NLP operations on multi-segment documents. For example, certain embodiments of the present invention utilize systems, methods, and computer program products that perform NLP operations on multi-segment documents by generating document segmentation machine learning models, using document segmentation machine learning models to determine document segments of input multi-segment documents, enabling adaptive multi-segment summarization of multi-segment documents, and enabling guided interaction with multi-segment documents.

In accordance with one aspect, a method is provided. In one embodiment, the method comprises: for each segment type of a plurality of segment types as defined by a segment schema: (i) identifying a segment corpus for the segment type, wherein the segment corpus comprises each document segment of one or more multi-segment documents that is associated with the segment type; (ii) identifying a summarization density hyper-parameter for the segment type; and (iii) generating an adaptive segment summary for the segment type based at least in part on the segment corpus for the segment type and the summarization density hyper-parameter for the segment type; generating an adaptive multi-segment summary based at least in part on each adaptive segment summary; and performing one or more summarization-based actions based at least in part on the adaptive multi-segment summary.

In accordance with another aspect, a computer program product is provided. The computer program product may comprise at least one computer-readable storage medium having computer-readable program code portions stored therein, the computer-readable program code portions comprising executable portions configured to: for each segment type of a plurality of segment types as defined by a segment schema: (i) identify a segment corpus for the segment type, wherein the segment corpus comprises each document segment of one or more multi-segment documents that is associated with the segment type; (ii) identify a summarization density hyper-parameter for the segment type; and (iii) generate an adaptive segment summary for the segment type based at least in part on the segment corpus for the segment type and the summarization density hyper-parameter for the segment type; generate an adaptive multi-segment summary based at least in part on each adaptive segment summary; and perform one or more summarization-based actions based at least in part on the adaptive multi-segment summary.

In accordance with yet another aspect, an apparatus comprising at least one processor and at least one memory including computer program code is provided. In one embodiment, the at least one memory and the computer program code may be configured to, with the processor, cause the apparatus to: for each segment type of a plurality of segment types as defined by a segment schema: (i) identify a segment corpus for the segment type, wherein the segment corpus comprises each document segment of one or more multi-segment documents that is associated with the segment type; (ii) identify a summarization density hyper-parameter for the segment type; and (iii) generate an adaptive segment summary for the segment type based at least in part on the segment corpus for the segment type and the summarization density hyper-parameter for the segment type; generate an adaptive multi-segment summary based at least in part on each adaptive segment summary; and perform one or more summarization-based actions based at least in part on the adaptive multi-segment summary.

BRIEF DESCRIPTION OF THE DRAWINGS

Figure 1:
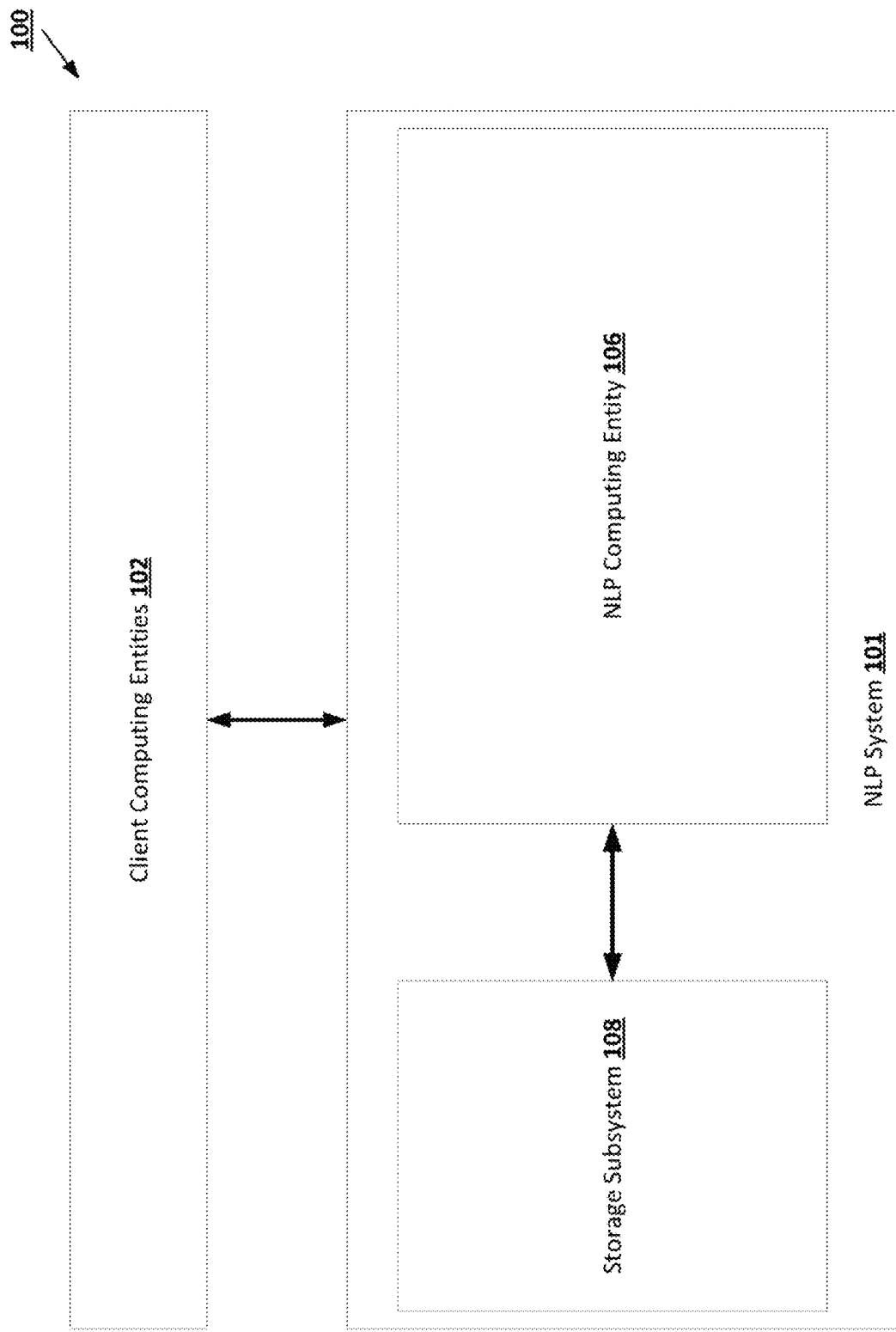

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
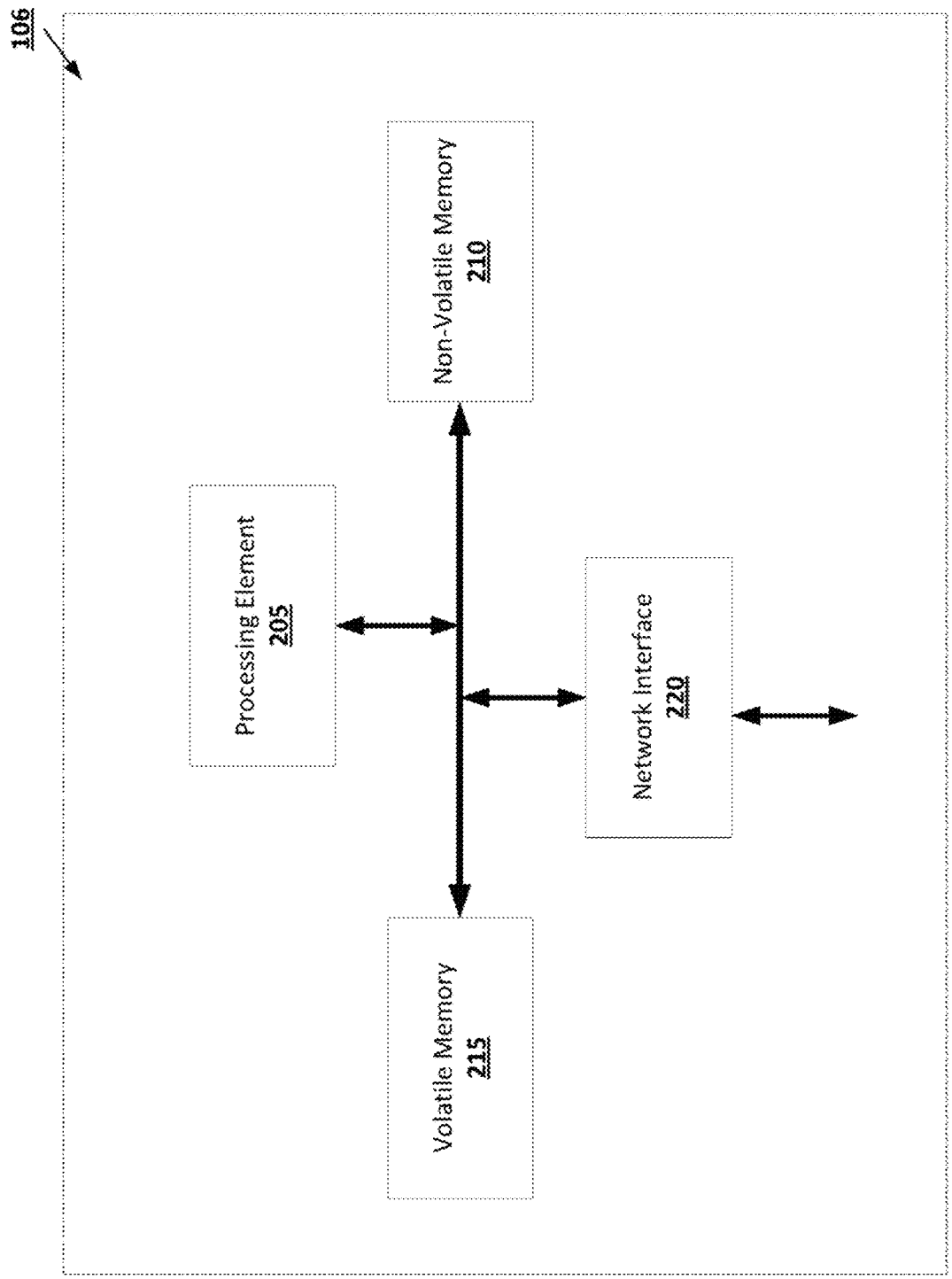

FIG. 2 provides an example NLP computing entity in accordance with some embodiments discussed herein.

Figure 3:
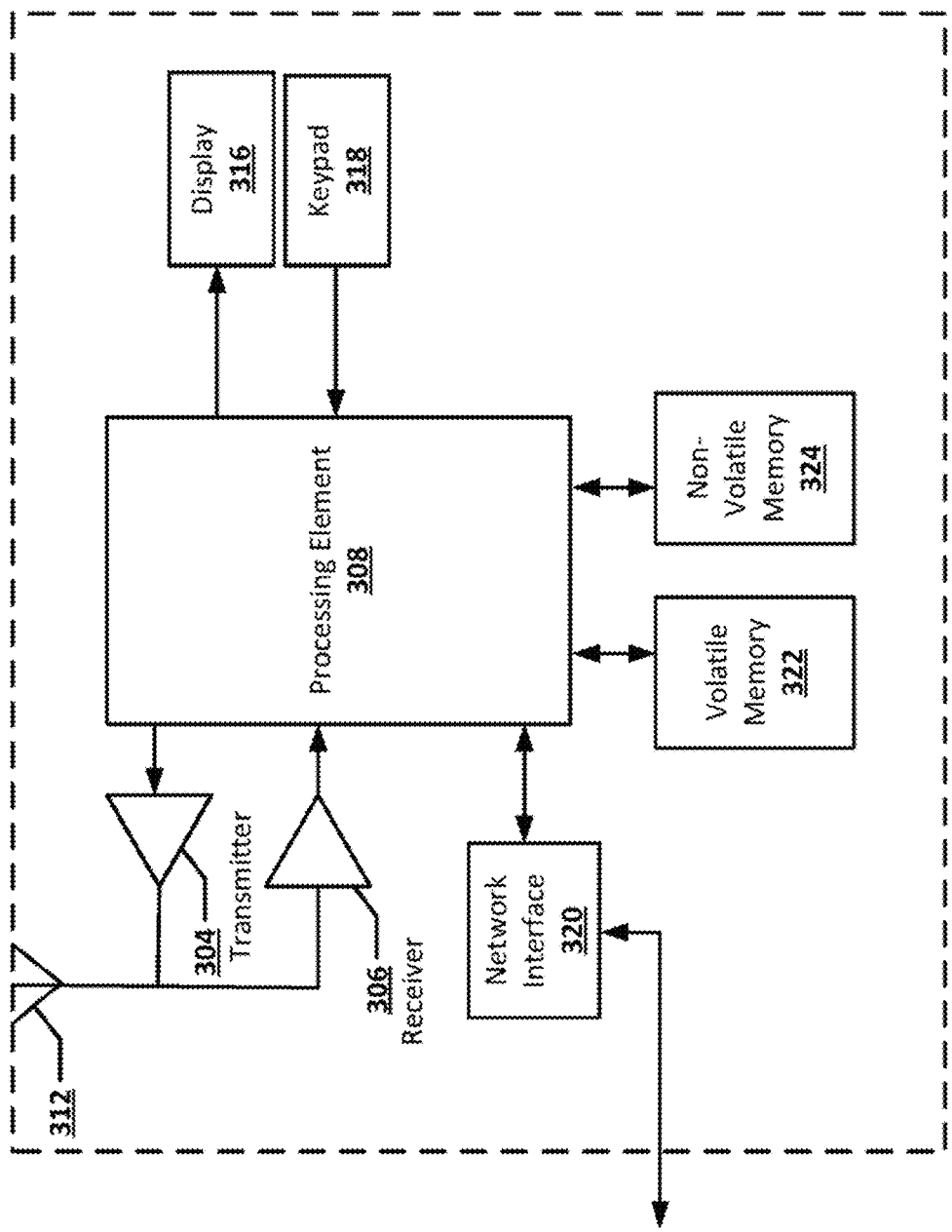

FIG. 3 provides an example client computing entity in accordance with some embodiments discussed herein.

Figure 4:
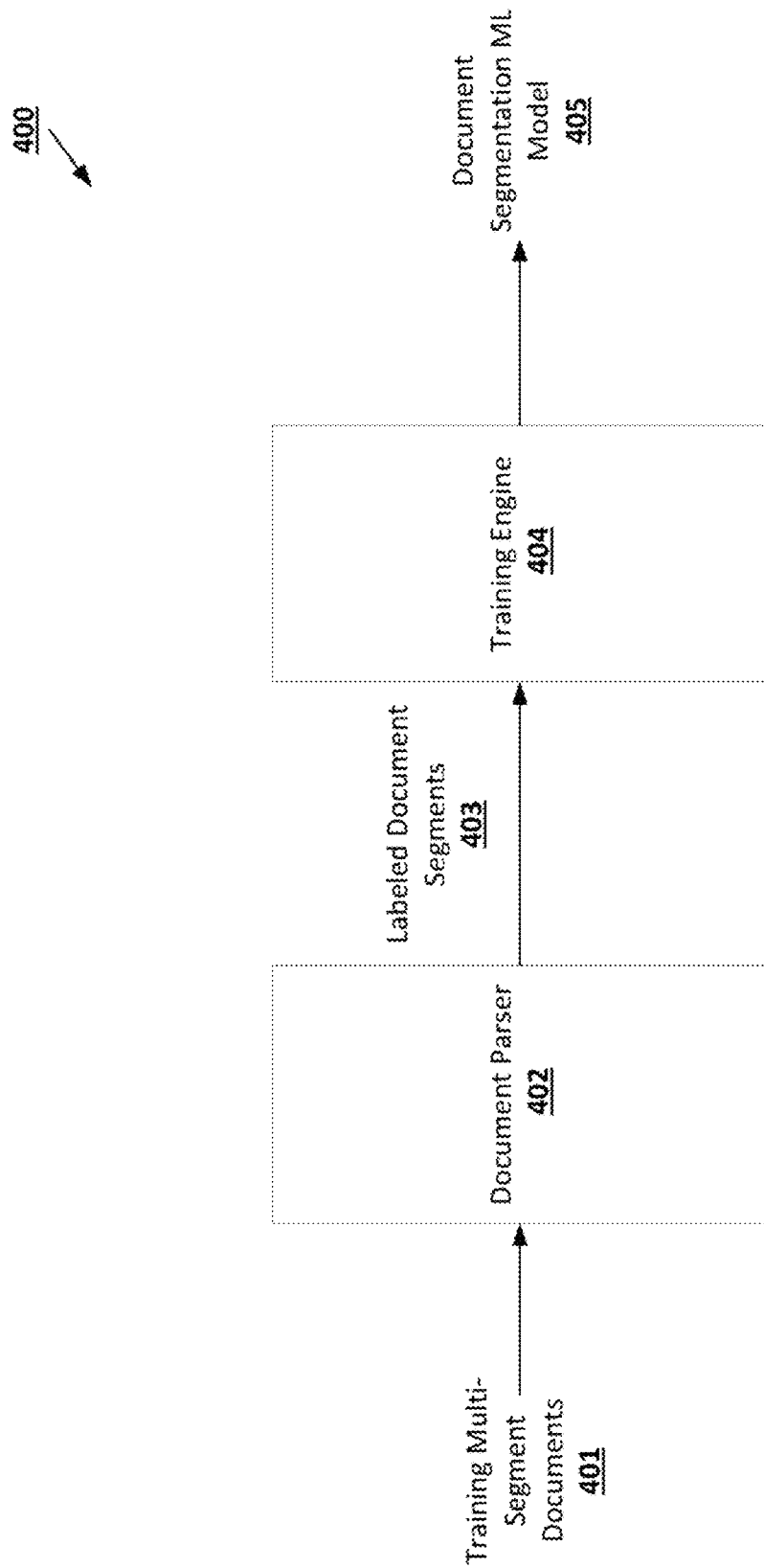

FIG. 4 is a data diagram of an example process for training a document segmentation machine learning model in accordance with some embodiments discussed herein.

Figure 5:
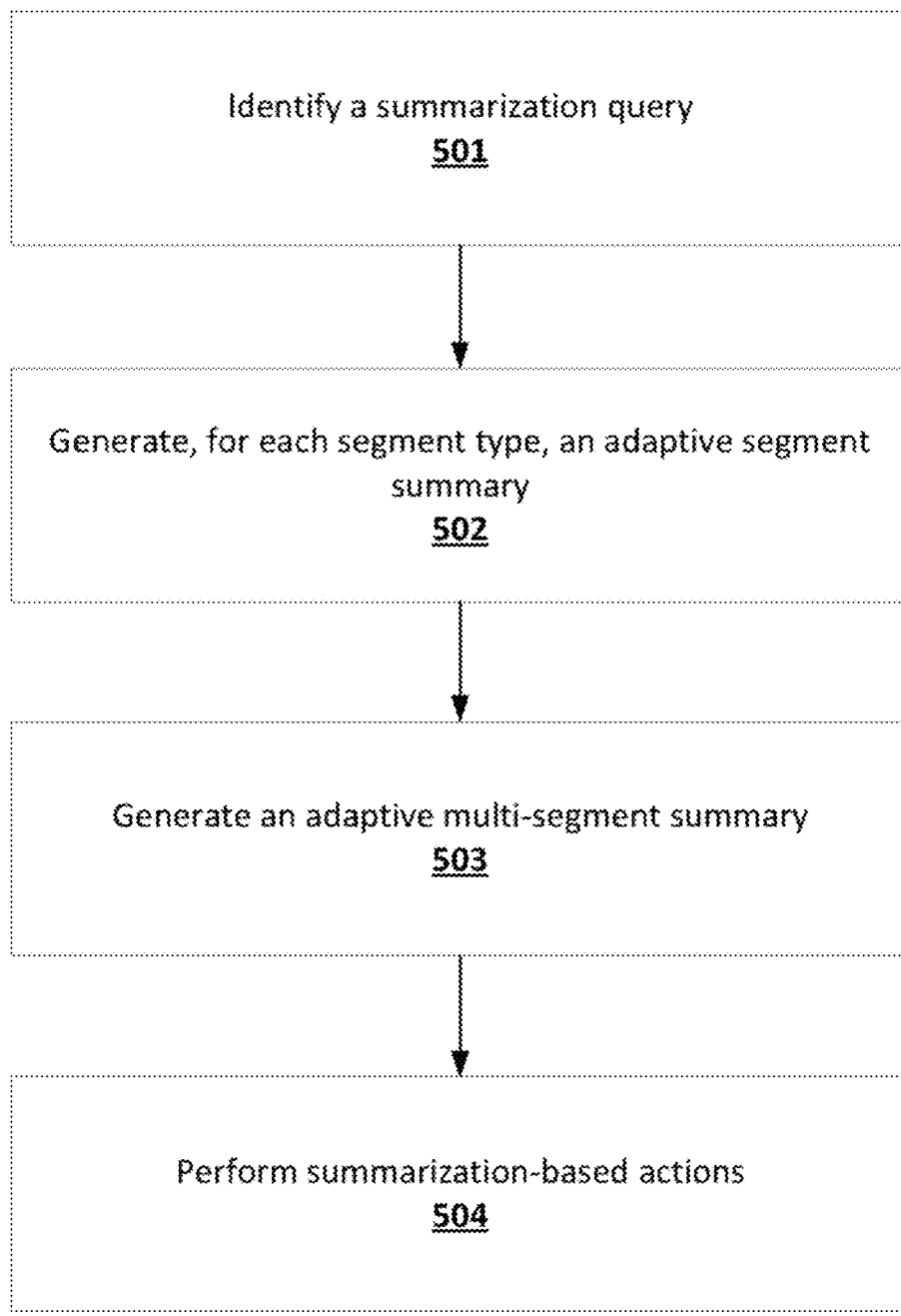

FIG. 5 is a flowchart diagram of an example process for adaptive multi-segment summarization of one or more multi-segment documents that are associated with a segment schema in accordance with some embodiments discussed herein.

Figure 6:
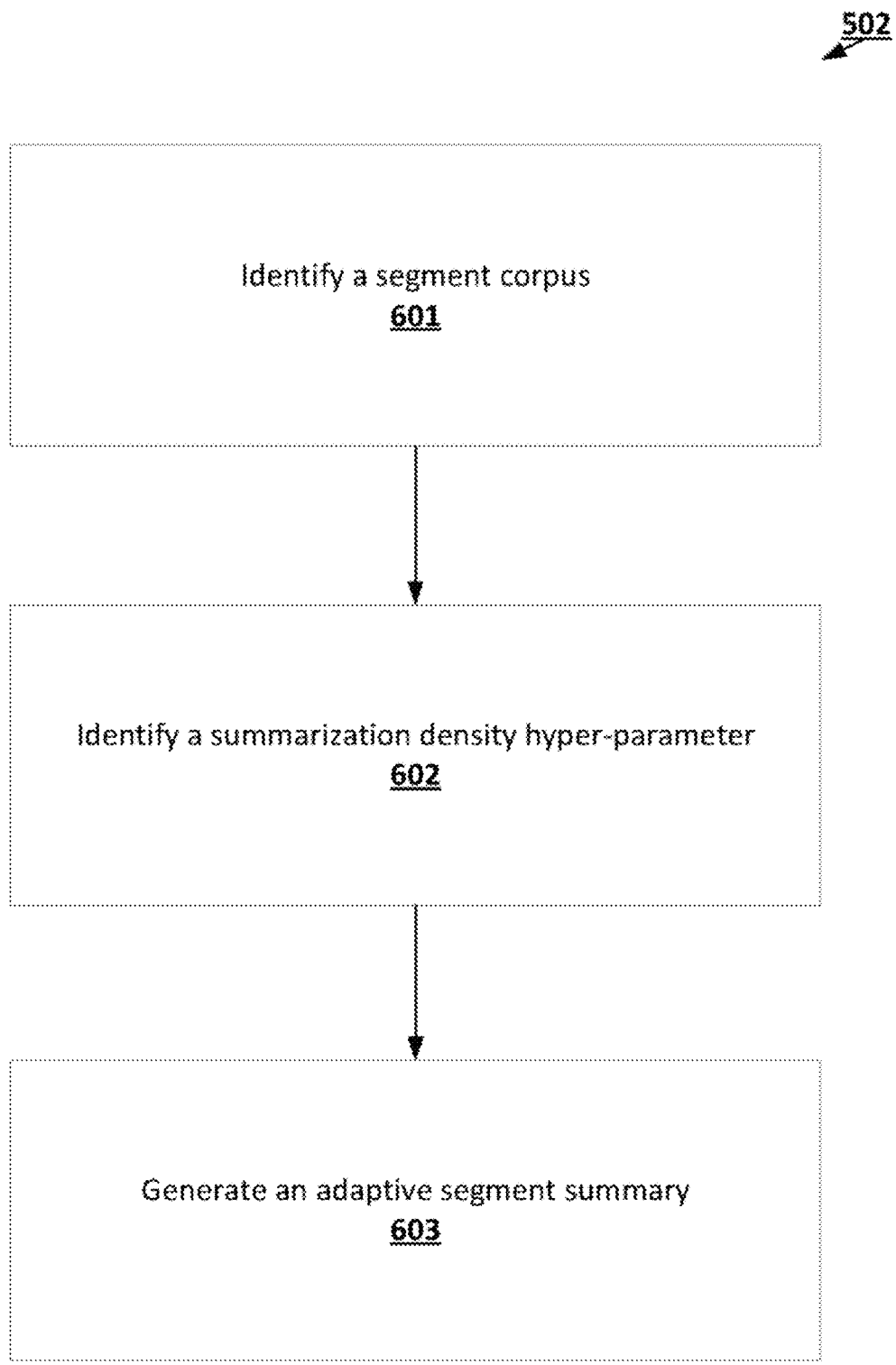

FIG. 6 is a flowchart diagram of an example process generating an adaptive segment summary for a particular segment type in accordance with some embodiments discussed herein.

Figure 7:
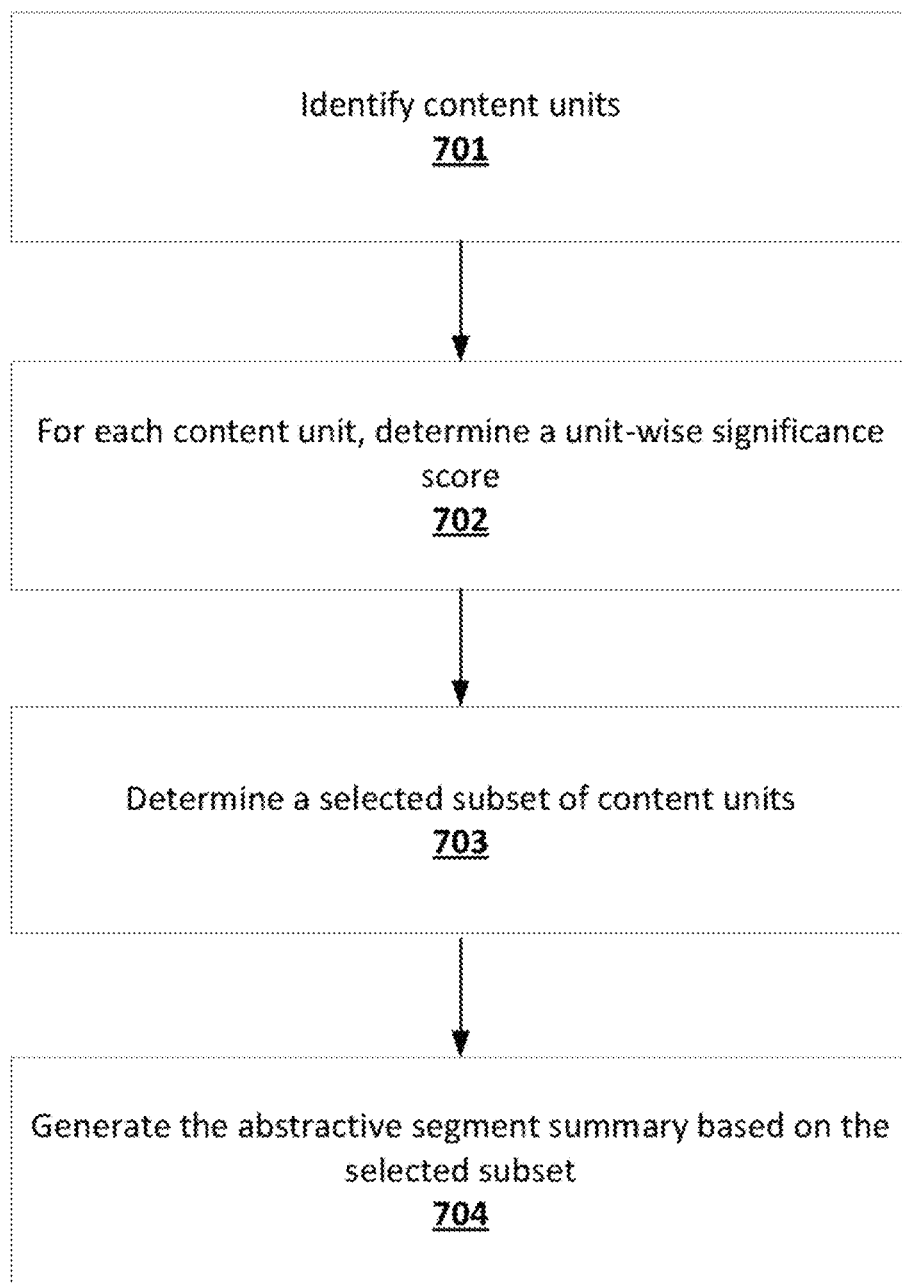

FIG. 7 is a flowchart diagram of an example process for generating the adaptive segment summary for a particular segment type based at least in part on the segment corpus for the particular segment type and the summarization density hyper-parameter for the particular segment type in accordance with some embodiments discussed herein.

Figure 8:
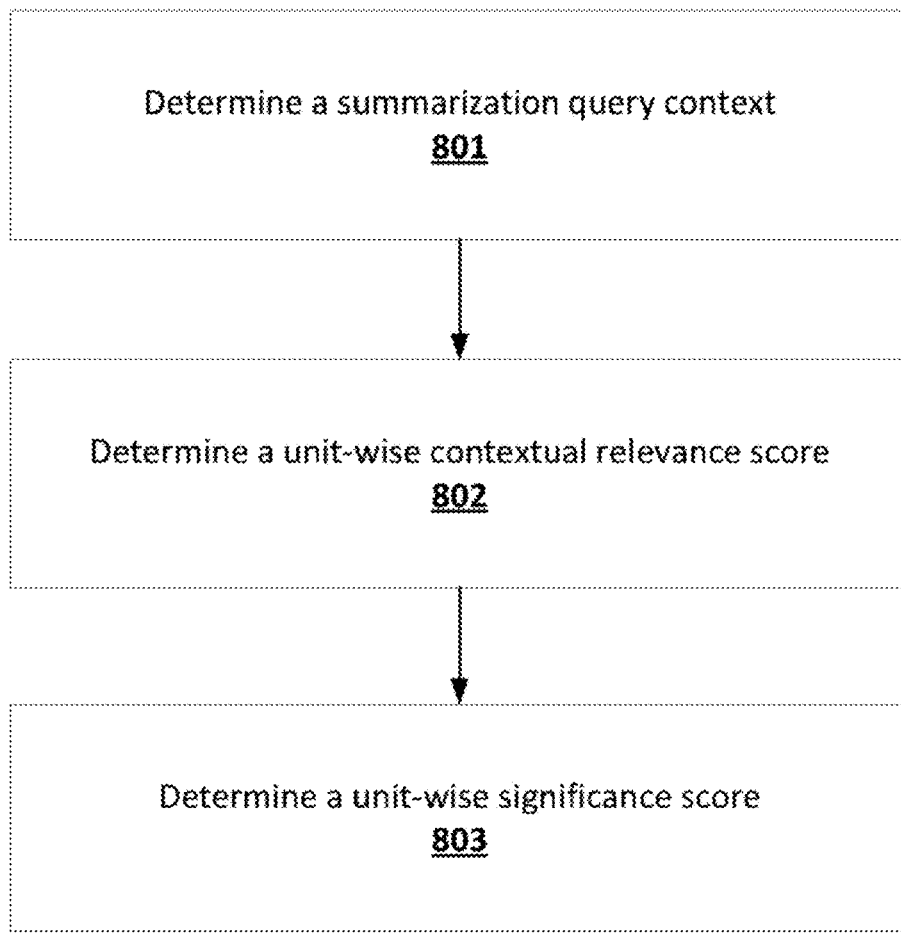

FIG. 8 is a flowchart diagram of example process for determining the unit-wise significance score for a particular content unit in accordance with some embodiments discussed herein.

Figure 9:
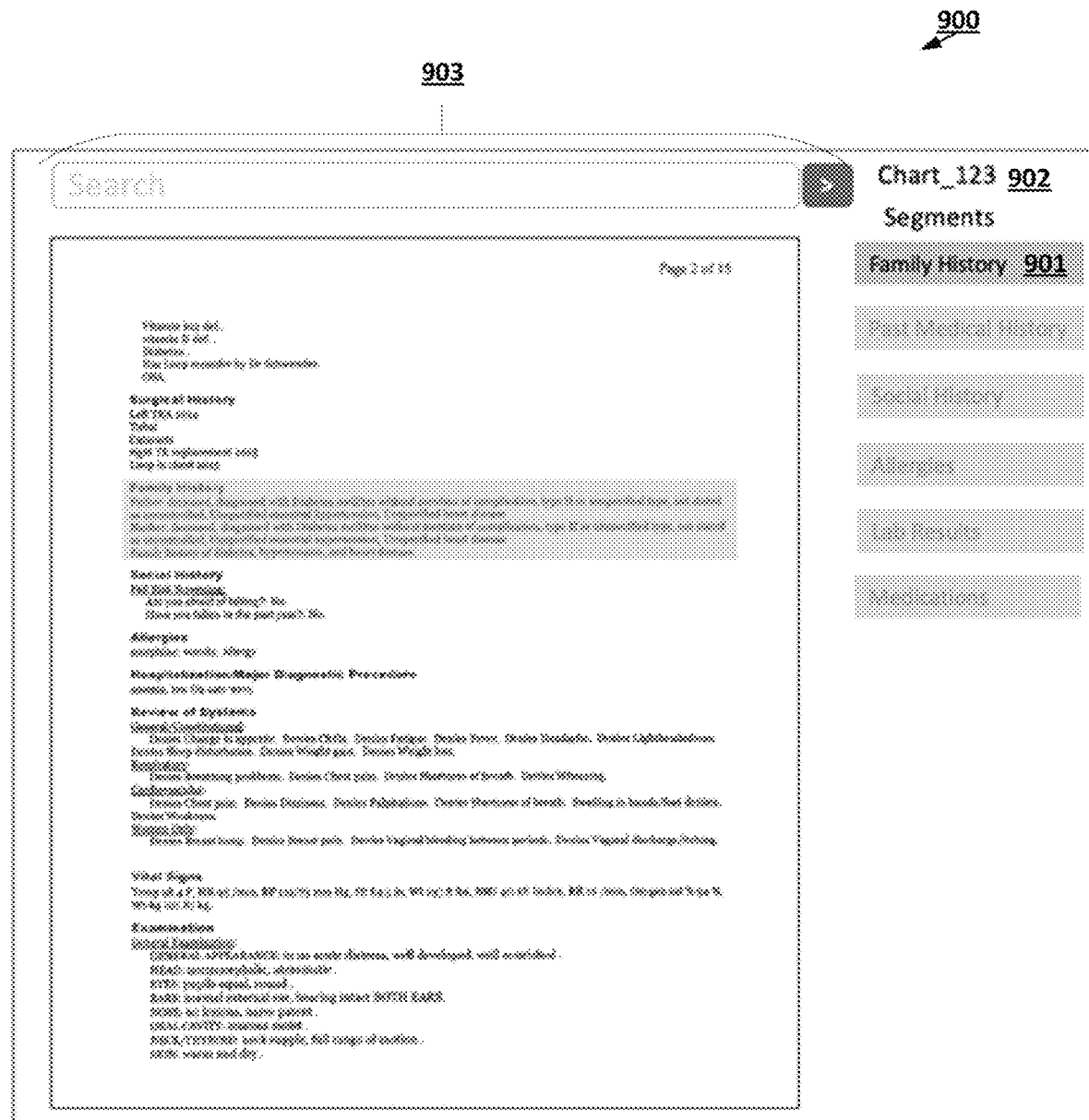

FIG. 9 provides an operational example of a document interaction user interface in accordance with some embodiments discussed herein.

Figure 10:
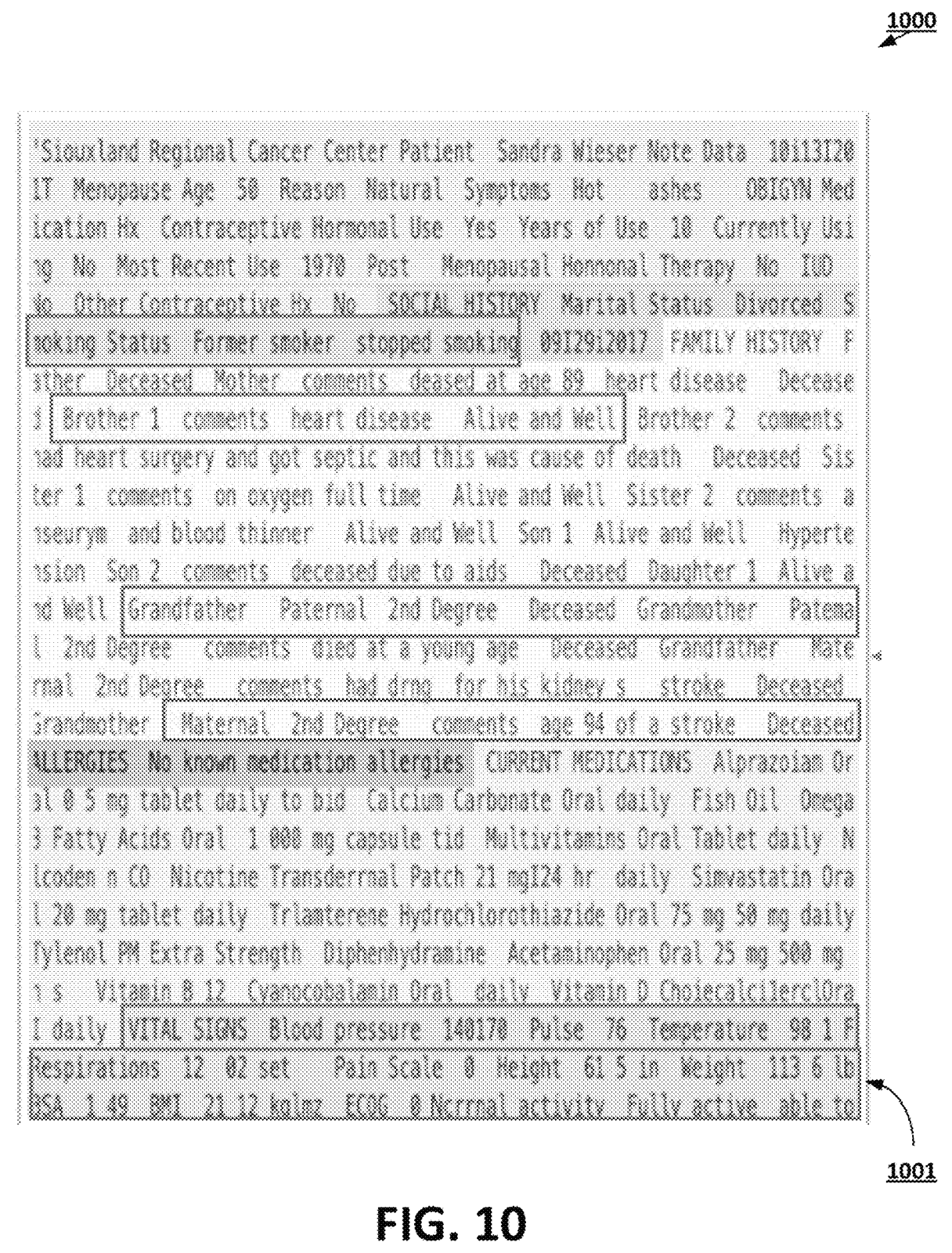

FIG. 10 provides an operational example of a multi-segment summarization user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to NLP, one of ordinary skill in the art will recognize that the disclosed concepts can be used to perform other types of data analysis.

I. OVERVIEW AND TECHNICAL IMPROVEMENTS

Various embodiments of the present invention address technical challenges associated with network transmission efficiency and network transmission throughput of NLP server systems that are configured to perform summarization on multi-segment documents by disclosing adaptive multi-segment summarization techniques. For example, in some embodiments, the adaptive multi-segment summarization techniques introduced herein enable defining variable summarization density rates for different segments of a multi-segment documents. This enables reducing the size of summarization outputs by reducing the segment summaries for those segments having lower summarization density rates, which in turn decreases the size of data that needs to be transmitted from NLP server systems performing multi-segment document summarization to client computing entities and thus improves network transmission efficiency of NLP server systems. The adaptive multi-segment summarization techniques introduced herein enable using the summarization output data packet capacity more effectively to include more in-depth segment summaries for those segments having higher summarization density rates, which in turn increases network transmission throughput of NLP server systems that are configured to perform summarization on multi-segment documents. Accordingly, by disclosing adaptive multi-segment summarization techniques, various embodiments of the present invention address technical challenges associated with network transmission efficiency and network transmission throughput of NLP server systems. In doing so, various embodiments of the present invention make important technical contributions to the field of NLP.

An exemplary application of various embodiments of the present invention relates to medical chart processing. The first step to process these charts may be to use an optical code recognition (OCR) engine to extract text out of them. The next step may be to feed the output text from the OCR engine to a machine learning (ML) model to do a specific task, e.g., to perform coding quality analysis to use the chart's text to infer what diseases are in the chart (e.g., diabetes, cancer, and/or the like). However, this OCRed text may not have a structure and the different segments in the chart are not specified (e.g., family history, past medical history, vital signs, and/or the like). Although each medical chart belongs to one specific patient, medical charts are often multi-modal in that they cover multiple information aspects about the patient, e.g., they cover medications that the patient is taking, family history of the patient, the patient's past medical history, among others.

As a result, feeding the unstructured medical chart, as a collection of text, to a ML model makes it difficult for the model to focus on the information that is relevant to the task. For example, in coding quality processes, in order for a ML model to infer diseases from the chart, it has to detect the most interesting parts of the chart (e.g., past medical history of the patient) that may have a signature of a specific disease and not to look for other irrelevant information for the task (e.g., provider address or patient address). Furthermore, this unstructured text cannot be easily utilized in other downstream tasks such as text summarization or building a search engine. Therefore, there is a need to build a structure out of the text of the OCRed charts before feeding them to ML models. Such structure contains the different segments in the chart where each segment is assigned to a label that reflects the type of information present in the segment (e.g., family history, surgical history).

In response, various embodiments of the present invention a novel framework that generates a structure for unstructured medical charts. The proposed Chart Profiler takes the OCRed chart and generate a structure for the chart that describes logically coherent sub-chart units of the chart, e.g., family history, social history, medications, and/or the like. This makes it easier for the ML model to focus on the specific segments that are more valuable to the model and ignore the noisy segments that are not useful. Furthermore, such structures can be reused to support a wide variety of downstream tasks such as research, audit, chart summarization, and/or the like.

In some embodiments, Chart Profiler is a framework for building a structure for medical charts. Chart Profiler consists of two modules: a Segmentation Engine and a Profile Index. The core idea of the Segmentation Engine is to segment the text in the unstructured charts (e.g., OCRed images) and assign a class to each segment based at least in part on a pre-defined set of classes (e.g., family history, past medical history, and/or the like) and by using a set of classification machine learning models. The Chart Profiler accomplishes this task by utilizing the structured medical documents (within a corporate or a publicly available dataset) to train a ML model to classify segments of the medical chart. The classified segments are then indexed in the Profile Index where they can be used by downstream tasks (e.g., adaptive summarizer, chart navigator, search engine, and/or the like). The Chart Profiler can also work as a web service that can be used by any other systems that require structuring medical charts.

Various embodiments of the present invention disclose an Adaptive Summarizer. In some embodiments, Adaptive Summarizer is a tool that is used to build a text summary out of one or multiple medical charts based at least in part on the user's needs. The core idea in the Adaptive Summarizer is to use the segments in a medical chart to build the text summary. These segments could be from an inherently structured document, a chart structure generated by the Chart Profiler, or a chart structure generated by any other approach. The Adaptive Summarizer allows the user to specify the parts that the user is interested in (e.g., family history, past medical history, and/or the like) based at least in part on the available segments in the underlying corpus. It, can adapt the generated summary based at least in part on the underlying condition of the patient (e.g., lung cancer), and based at least in part on the specialty of the user (e.g., doctor/nurse). The tool also allows users to specify the level of details of each segment (e.g., short summary for medical history segment).

In some embodiments, the Adaptive Summarizer is a tool that is used to build a text summary out of one or multiple medical charts based at least in part on the user's needs. The tool uses the segments in the chart to do this task. These segments could be from an inherently structured document, a structure that is generated by the Chart Profiler, or a structure that is generated by any other approach. The tool allows the user to specify the segments that the user wants to focus on and also the level of details that the user expects want for each segment. The tool also adapts the generated summary based at least in part on the underlying condition of the patient and/or based at least in part on the specialty of the user. To illustrate how this tool works, consider the following example: a doctor would like to see a patient's social history, family history and medications the patient has been taking. The doctor also would like to see a short summary of the patient's past medical history. The patient is visiting the doctor because of her/his underlying condition, Diabetes. The doctor opens the Adaptive Summarizer tool and selects the patient (using patient's name, ID, or any available identifier). The tool gives the doctor a list of available charts for this patient and the available segments in these charts (e.g., family history, medications, and/or the like). The doctor then selects what segment(s) that she/he is interested in. In this example, the doctor could select "social history", "family history" and "past medical history." For each of the selected segments, the tool gives the doctor the option to select the "level of details" they want in each section. This "level of details" is translated into "text density level" of the section which means a summary of the text in the section. This text summary is generated from the original text of the section using a text summarization approach. The level of details, and hence the text density level is specified by the doctor as a percentage. For example, the doctor can specify that she/he wants 20% of details in the "past medical history" section for that patient. Assuming that the "past medical history" section for the selected patient has 30 sentences, the Adaptive Summarizer starts to apply text summarization on that section and assigns scores to sentences based at least in part on each sentence importance. Sentence importance is dependent on the text summarization approach used. Another important factor of sentence importance is the underlying condition of the patient, such as diabetes. The Adaptive Summarizer increases the scores of sentences/phrases that are related to diabetes in the different segment. For example, in the family history section, a sentence such as 'Father with diabetes mellitus' will be assigned a high importance score so it will be in the final summary. Once the importance scores are assigned to each sentence in the section, the Adaptive Summarizer returns the top ranked 20% (6) sentences of that section to the doctor.

Another feature of the Adaptive Summarizer may be that it allows the user to upload a chart (as images). The tool then connects to an OCR engine (e.g., Microsoft Azure Cognitive Service) and sends the chart images to be OCRed. Once the output text returns from the OCR engine, since the OCR output is not structured, the Adaptive Summarizer sends it to another service to be structured, such as the Chart Profiler. The returned structure is then used to generate a summary using the Adaptive Summarizer.

Various embodiments of the present invention disclose a Segmentation Engine. In some embodiments, the main task of the Segmentation Engine is to take an unstructured text document (e.g., an OCRed image) and segment it into coherent segments each having an information segment type. During a training stage for the Segmentation Engine, the main task is to use a corpus of structured medical documents to train a text segmentation algorithm. These structured medical documents can be sourced from any available structured documents in the corporate or from any publicly available datasets. The structure of these documents is first parsed by a Document Parser, which is a piece of software that can be customized based at least in part on the structure of the available documents. The Document Parser extracts the different available sub-document units, i.e., information segments from the structured documents along with each segment label (e.g., family history) that represents the type of information in that segment. After extracting the different information segments and their labels from all the structured medical documents in the available corpus, the segments and their labels are then used for training a Text Segmentation (TS) model. This model could be any text segmentation model. Once this TS model is trained, it is saved to be used later on in the Structuring stage.

Various embodiments of the present invention disclose a Profile Index, which may be a database where the segments generated from the Segmentation Engine are saved. Segments in this database are linked to a unified identifier (ID) which could be a member ID. This ID can be used to retrieve segments based at least in part on an application request, e.g., a search engine query. This database represents a centralized index for members where members' information units are saved.

Various embodiments of the present invention disclose a Chart Navigator, which may be a tool that allows the user to navigate a medical chart using the textual structure of that chart. The textual structure of the medical chart can be inherently presented in the chart, generated by the Chart Profiler, or generated by any other structuring approach. To illustrate how the Chart Navigator works, consider the following example: a chart reviewer wants to review a chart and wants to focus on a specific segment of the chart to make a decision. The reviewer opens the Chart Navigator and selects the patient or the chart they want to review. They can do the selection based at least in part on different criteria, such as, chart ID, patient ID, patient name, date of service, and/or the like. Once the desired chart is loaded, the Chart Navigator uses the structure of the chart to show the reviewer the available segments in that chart. The reviewer can then click on the segment they want to navigate. The Chart Navigator then uses the text of the selected segment to navigate through the segment in the chart's image. This tool also highlights the selected segment in the image of a multi-segment document.

II. DEFINITIONS

The term "multi-segment document" may refer to a data construct that is configured to describe a document data object having multiple document segments, where each document segment of a multi-segment document may comprise a subset of content data associated with the multi-segment document that is associated with a segment type as defined by a segment schema. Examples of multi-segment documents include training multi-segment documents, structured multi-segment documents, unstructured multi-segment documents, and/or the like. For example, a training multi-segment document may be any document having two or more predefined document segments whose document segments are used for generating a document segmentation machine learning model. An example of a training multi-segment document is a structured medical chart having two or more designated document segments, such as a family history document segment, a past medical history document segment, a social history document segment, a medication description document segment, a lab result document segment, and/or the like.

The term "document segmentation machine learning model" may refer to a data construct that is configured to describe parameters, hyper-parameters, and/or defined operations of a machine learning model, where the machine learning model is configured to determine one or more document segments of a multi-segment document (e.g., an unstructured multi-segment document that is not associated with structural metadata). For example, in some embodiments, given a multi-segment document, the content data (e.g., the text data) associated with the multi-segment document may be used to generate a set of candidate segments, where each candidate segment comprises a subset of the candidate data of the multi-segment data. Afterward, each candidate segment may be provided to the document segmentation machine learning model to generate an inferred prediction that describes, for each of n segment types, an inferred likelihood that the candidate segment is a document segment corresponding to the segment type. In this way, the document segments of the multi-segment document may be determined based at least in part on each inferred prediction for a candidate segment of the multi-document segment. For example, in some embodiments, the inferred prediction for a kth candidate segment is a n-dimensional vector with n values each describing an inferred likelihood (e.g., a normalized inferred likelihood) that the kth candidate segment is associated with a corresponding segment type of n segment types. In some of those embodiments, each n-dimensional vector for a kth candidate segment is used to determine whether the kth candidate segment is at least a part of a document segment having a particular segment type. In an exemplary embodiment, the kth candidate segment is deemed to be a part of a document segment having a particular segment type if the inferred likelihood for the kth candidate segment and the particular segment type satisfies (e.g., exceeds) an inferred likelihood threshold. In another exemplary embodiment, the kth candidate segment is deemed to be a part of a document segment for a document segment type whose corresponding inferred likelihood is larger than all of the other inferred likelihoods associated with the kth candidate segment. In yet another exemplary embodiment, the document segment for a particular segment type is deemed to comprise at least the kth candidate segment whose inferred likelihood with respect to the particular segment type is larger than other inferred likelihoods for other candidate segments with respect to the particular segment type. In some embodiments, inputs to a document segmentation machine learning model comprise one or more vectors describing feature data for an input candidate segment, while outputs of a document segmentation machine learning model comprise a vector describing the inferred prediction for the noted input candidate segment.

The term "segment schema" may refer to a data construct that is configured to describe n (e.g., one or more, two or more, and/or the like) segment types that the document segmentation machine learning model is configured to identify. In some embodiments, the document segmentation machine learning model is configured to select, for each segment type defined by the segment schema, a selected document subset of an input multi-segment document, where each document segment is associated with a corresponding segment type defined by the segment schema, and where each document segment is generated based at least in part on the selected document subset for the corresponding segment type that is associated with the document segment.

The term "summarization query" may refer to a data construct that is configured to describe one or more features of a request for summarizing content data (e.g., text data). For example, the summarization query may include a summarization profile identifier (e.g., a patient/member profile identifier) that can be used to identify all of the multi-segment documents that are associated with the summarization profile for the summarization profile identifier. In an exemplary embodiment, if the summarization query describes a patient/member profile identifier, all of the medical chart documents associated with the patient/member profile identifier may be retrieved/identified.

The term "adaptive segment summary" may refer to a data construct that is configured to describe a summary of content data associated with the segment type that is summarized in accordance with segment-specific summarization density guidelines for the segment type. For example, if a first segment type is associated with first segment-specific summarization density guidelines that require more density intensive summarization of the content data associated with the segment type compared to second segment-specific summarization density guidelines of a second segment type, then the adaptive segment summary for the first segment type may have a smaller portion of the content data associated with the first segment type than the portion of the content data associated with the second segment type that is included in the adaptive summary of the second segment type. In some embodiments, generating the adaptive multi-segment summary for a particular segment type comprises: (i) identifying one or more content units of the segment corpus for the particular segment type; (ii) for each content unit, determining a unit-wise significance score; (iii) determining a selected subset of the one or more content units having highest unit-wise significance scores, wherein: (a) a cardinality of the selected subset is determined based at least in part on a defined ratio of a count of the one or more content units, and (b) the defined ratio is determined based at least in part on the summarization density hyper-parameter for the particular segment type; and (iv) generating the adaptive multi-segment summary based at least in part on the selected subset.

The term "segment corpus" may refer to a data construct that is configured to describe a combination of each document segment of the one or more multi-segment documents that is associated with the segment type. For example, given p multi-segment documents (e.g., given p multi-segment documents associated with a summarization profile, such asp multi-segment documents associated with a patient/member profile), where each multi-segment document comprises n document segments, then of a total of n*p document segments, the segment corpus for each segment type may comprise p of the n*p document segments, i.e., from each of the p multi-segment documents, one of the document segments of the multi-segment document that is deemed to be associated with the particular segment type.

The term "summarization density hyper-parameter" may refer to a data construct that is configured to describe a user-selected summarization density for summarizing content data associated with a corresponding segment type, such that content data for a segment type having a higher summarization density hyper-parameter may be more intensely summarized (e.g., a greater portion of the content data associated with the segment type will be excluded during summarization) than a segment type having a lower summarization density hyper-parameter. In some embodiments, each summarization density hyper-parameter for a segment type of the segment schema is defined by the summarization query and/or by another user-provided query. For example, in some embodiments, if content data associated with a particular segment type is associated with u content units, then the number of content units included in the adaptive segment summary for the particular segment type may be determined based at least in part on u h (e.g., may be determined based at least in part on the floor and/or ceiling of u h), where h is the summarization density hyperparameter for the particular segment type. In some embodiments, if content data associated with a particular segment type includes 100 content units (e.g., 100 defined linguistic units, such as 100 sentences), and if the particular segment type is associated with the summarization density hyperparameter of 22 percent, then only 22 of the content units of the particular segment type may be included in the adaptive segment summary of the particular segment type.

The term "unit-wise significance score" may refer to a data construct that is configured to describe a relative significance measure of a content unit to significance measures of other content units of the segment corpus of the content unit. For example, the unit-wise significance score for a content unit. For example, if a sentence $S_1$ of a segment corpus is associated with a unit-wise significance score $SS_1$ that is larger than a unit-wise significance score $SS_2$ of a sentence $S_2$ of the segment corpus, then $S_1$ may be deemed to be more significant of a sentence than $S_2$. In some embodiments, the unit-wise significance score for a content unit in a segment corpus is determined based at least in part on a summarization query context for a summarization query. For example, if the summarization query context describes that the summarization query pertains to a diabetes-related analysis, then the unit-wise significance score for a content unit may describe a significance measure for the content unit with respect to diabetes.

The term "summarization query context" may refer to a data construct that is configured to describe a subject matter of the summarization query, and may for example be inferred based at least in part on one or more fields of the summarization query. For example, in some embodiments, the summarization query context may be explicitly be defined by one or more fields of the summarization query. As another example, the summarization query context may be inferred based at least in part on a specialization of a query-initiating provider profile (e.g., a medical query-initiating provider profile) that is associated with the summarization query and is defined by one or more fields of the summarization query. As another example, the summarization query context may be inferred based at least in part on a current condition of the summarization profile that is associated with the summarization query and is defined by one or more fields of the summarization query. In some embodiments, the summarization query context describes one or more summarization query context codes associated with the summarization query context.

The term "summarization query context code" may refer to a data construct that is configured to describe any code that describes at least a portion of a summarization query context for a summarization query. Examples of summarization query context codes include diagnosis codes, procedure codes, drug codes, and/or the like. For example, if a summarization query pertains to a diabetes-related analysis, then the summarization query context codes for the summarization query may comprise a diagnosis code for diabetes. As another example, if a summarization query pertains to an appendix removal surgery, then the summarization query context codes for the summarization query may comprise a procedure code for appendix removal surgery.

The term "unit-wise contextual relevance score" may refer to a data construct that is configured to describe a relative significance measure for the content unit with respect to other significance measures of other content units in the same segment corpus as the content unit, where the relative significance measure is determined with respect to a summarization query context for a summarization query. In some embodiments, determining the unit-wise contextual relevance score for the particular content unit comprises: determining one or more summarization query context codes associated with the summarization query context; and determining, using a content unit significance prediction machine learning model and based at least in part on the particular content unit and the one or more summarization query context codes, unit-wise contextual relevance score.

The term "content unit significance prediction machine learning model" may refer to a data construct that is configured to describe parameters, hyper-parameters, and/or defined operations of a machine learning model, where the machine learning model is process feature data associated with a content unit along with one or more summarization query context codes to determine an output that can be used to generate a unit-wise contextual relevance score for the content unit with respect to a summarization query context that is associated with the one or more summarization query context codes. For example, the content unit significance prediction machine learning model may be configured to process a sentence and a diagnosis code to generate an output that describes a predicted relevance measure for the sentence with respect to the diagnosis code. In some embodiments, given u sentences in a segment corpus, the predicted relevance measures for the u sentences may be normalized to generate the unit-wise contextual relevance scores for the u sentences. The u sentences can then be ranked in accordance with their unit-wise contextual relevance scores. In some embodiments, inputs to the content unit significance prediction machine learning model comprise: (i) one or more vectors describing feature data for an input content unit, and/or (ii) one or more vectors describing the one or more summarization query context codes. In some embodiments, outputs of the content unit significance prediction machine learning model may include an atomic value and/or a vector describing the predicted relevance measure for the input content unit with respect to the one or more summarization query context codes. In some embodiments, the content unit significance prediction machine learning model is trained based at least in part on training data that is generated based at least in part on existing documents that are associated with summarization query context code. For example, in some embodiments, if a sentence appears in a document that has a particular summarization query context code (e.g., a particular diagnosis code), then a training entry is created that describes that there is an affirmative (e.g., one-valued) label for association of feature data associated with the sentence and the particular summarization query context code. For example, if sentence $S_3$ appears in a document that is associated with the diagnosis code $ICD_1$, then the training entry $\{S_3, ICD_3, 1\}$ may be generated.

The term "adaptive multi-segment summary" may refer to a data construct that is configured to a summary of a set of multi-segment documents, where each segment corpus that is associated with the multi-segment document is summarized in accordance with specified summarization density requirements for the corresponding segment type of the segment corpus. In some embodiments, a computing entity combines each adaptive segment summary for the n segment types to generate the adaptive multi-segment summary for the one or more multi-segment summaries. In some embodiments, a computing entity performs one or more other NLP operations (e.g., one or more extractive summarization operations, one or more abstractive summarization operations, and/or the like) on textual data comprising a combination of combines each adaptive segment summary for the n segment types to generate the adaptive multi-segment summary for the one or more multi-segment summaries.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing NLP. The architecture 100 includes an NLP system 101 configured to receive NLP requests from client computing entities 102, process the NLP requests to generate NLP outputs, provide the generated NLP output to the client computing entities 102, and automatically perform NLP-based actions based at least in part on the generated NLP outputs.

An example of an NLP-based action that can be performed using the NLP system 101 is generating and displaying an adaptive multi-segment summary of a multi-segment document. Another example of an NLP-based action that can be performed using the NLP system 101 is enabling guided interaction with a multi-segment document.

In some embodiments, NLP system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The NLP system 101 may include an NLP computing entity 106 and a storage subsystem 108. The NLP computing entity 106 may be configured to receive NLP requests from one or more client computing entities 102, process the NLP requests to generate NLP outputs corresponding to the NLP requests, provide the generated NLP outputs to the client computing entities 102, and automatically perform NLP-based actions based at least in part on the generated NLP outputs.

The storage subsystem 108 may be configured to store input data used by the NLP computing entity 106 to perform NLP operations as well as model definition data used by the NLP computing entity 106 to perform various NLP tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary NLP Computing Entity

FIG. 2 provides a schematic of an NLP computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the NLP computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the NLP computing entity 106 may include, or be in communication with, one or more processing elements 205 (also referred to as processors, processing circuitry, and/or similar terms used herein interchangeably) that communicate with other elements within the NLP computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the NLP computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the NLP computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the NLP computing entity 106 with the assistance of the processing element 205 and operating system.

As indicated, in one embodiment, the NLP computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the NLP computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the NLP computing entity 106 may include, or be in communication with, one or more input elements, such as a keyboard input, a mouse input, a touch screen/display input, motion input, movement input, audio input, pointing device input, joystick input, keypad input, and/or the like. The NLP computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the NLP computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the NLP computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the NLP computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the NLP computing entity 106 and/or various other computing entities.

In another embodiment, the client computing entity 102 may include one or more components or functionality that are the same or similar to those of the NLP computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Provided below are exemplary techniques for training a document segmentation machine learning model, for using a trained document segmentation machine learning model to identify document segments of a multi-segment document, for performing adaptive multi-segment summarization of a multi-segment document, and for enabling guided interaction (e.g., guided navigation) of a multi-segment document. However, while various embodiments of the present invention describe the four sets of operations described herein as being performed by the same single computing entity, a person of ordinary skill in the relevant technology will recognize that each of the noted sets of operations described herein can be performed by one or more computing entities that may be the same as or different from the one or more computing entities used to perform each of the other sets of operations described herein.

As described above, various embodiments of the present invention address technical challenges associated with network transmission efficiency and network transmission throughput of NLP server systems that are configured to perform summarization on multi-segment documents by disclosing adaptive multi-segment summarization techniques. For example, in some embodiments, the adaptive multi-segment summarization techniques introduced herein enable defining variable summarization density rates for different segments of a multi-segment documents. This enables reducing the size of summarization outputs by reducing the segment summaries for those segments having lower summarization density rates, which in turn decreases the size of data that needs to be transmitted from NLP server systems performing multi-segment document summarization to client computing entities and thus improves network transmission efficiency of NLP server systems. The adaptive multi-segment summarization techniques introduced herein enable using the summarization output data packet capacity more effectively to include more in-depth segment summaries for those segments having higher summarization density rates, which in turn increases network transmission throughput of NLP server systems that are configured to perform summarization on multi-segment documents. Accordingly, by disclosing adaptive multi-segment summarization techniques, various embodiments of the present invention address technical challenges associated with network transmission efficiency and network transmission throughput of NLP server systems. In doing so, various embodiments of the present invention make important technical contributions to the field of NLP.

Document Segmentation Machine Learning Models

FIG. 4 is a data flow diagram of an example process 400 for training a document segmentation machine learning model 405. Via the various steps/operations of the process 400, the NLP computing entity 106 can generate/update a machine learning model that can be used to determine segments of a multi-segment document.

The process 400 begins at when the NLP computing entity 106 identifies one or more training multi-segment documents 401. A training multi-segment document may be any document having two or more predefined document segments whose document segments are used for generating a document segmentation machine learning model. An example of a training multi-segment document is a structured medical chart having two or more designated document segments, such as a family history document segment, a past medical history document segment, a social history document segment, a medication description document segment, a lab result document segment, and/or the like.

The process 400 continues when a document parser 402 processes each training multi-segment document to determine document segments of the training multi-segment document. The document segments of all training multi-segment documents 401 are then aggregated to generate a group of labeled document segments 403, where each labeled document segment is associated with a label that describes an assigned segment type for the labeled document segment. For example, given n segment types, each labeled document segment 403 having a particular segment type may be associated with an n-dimensional vector that has a vector value for each segment type, where the n-dimensional vector has a first defined value (e.g., a first defined value of one) in a vector value location corresponding to the particular segment type and a second defined value (e.g., a second defined value of zero) in all other vector value locations.

As described above, a training multi-segment document may be a structured document. In some embodiments, to determine document segments of a training multi-segment document that is a structured document, the document parser 402 may be configured to use the structural metadata associated with the structured document. For example, the structural metadata may define a beginning point and an endpoint for each document segment having a corresponding document segment type of a corresponding structured document, and the document parser 402 may be configured to determine that the particular document segment comprises all of the content data associated with the structured document that fall between the defined beginning point and the defined endpoint of the particular document segment.

The process 400 continues when a training engine 404 uses the labeled document segments 403 to generate/update the document segmentation machine learning model 405. In some embodiments, to generate/update the document segmentation machine learning model 405, the training engine 404 performs m training iterations (where m may be determined based at least in part on a count of the labeled document segments 403). In some embodiments, during each training iteration, the training engine 404: (i) provides a labeled document segment to the document segmentation machine learning model 405 to determine an inferred prediction that describes an inferred likelihood that the labeled document segment is associated with each segment type of n segment types, (ii) determines an error function based at least in part on a relationship between an error measure of the inferred prediction for the labeled document segment and the label and one or more trainable parameters of the document segmentation machine learning model 405, and (iii) updates the parameters of the document segmentation machine learning model 405 in a manner that is configured to the error function. In some embodiments, given m labeled document segments, the training engine 404 may use the n labeled document segments to generate/update the document segmentation machine learning model 405 using a gradient-descent-based training technique, such as using a gradient-descent-based training technique that utilizes at least one of batch gradient descent and stochastic gradient descent.

Once generated, the document segmentation machine learning model 405 can be used to determine one or more document segments of a multi-segment document (e.g., an unstructured multi-segment document that is not associated with structural metadata). For example, in some embodiments, given a multi-segment document, the content data (e.g., the text data) associated with the multi-segment document may be used to generate a set of candidate segments, where each candidate segment comprises a subset of the candidate data of the multi-segment data. Afterward, each candidate segment may be provided to the document segmentation machine learning model 405 to generate an inferred prediction that describes, for each of n segment types, an inferred likelihood that the candidate segment is a document segment corresponding to the segment type. In this way, the document segments of the multi-segment document may be determined based at least in part on each inferred prediction for a candidate segment of the multi-document segment.

For example, in some embodiments, the inferred prediction for a kth candidate segment is a n-dimensional vector with n values each describing an inferred likelihood (e.g., a normalized inferred likelihood) that the kth candidate segment is associated with a corresponding segment type of n segment types. In some of those embodiments, each n-dimensional vector for a kth candidate segment is used to determine whether the kth candidate segment is at least a part of a document segment having a particular segment type. In an exemplary embodiment, the kth candidate segment is deemed to be a part of a document segment having a particular segment type if the inferred likelihood for the kth candidate segment and the particular segment type satisfies (e.g., exceeds) an inferred likelihood threshold. In another exemplary embodiment, the kth candidate segment is deemed to be a part of a document segment for a document segment type whose corresponding inferred likelihood is larger than all of the other inferred likelihoods associated with the kth candidate segment. In yet another exemplary embodiment, the document segment for a particular segment type is deemed to comprise at least the kth candidate segment whose inferred likelihood with respect to the particular segment type is larger than other inferred likelihoods for other candidate segments with respect to the particular segment type.

In some embodiments, the document segmentation machine learning model 405 is associated with a segment schema that describes n (e.g., one or more, two or more, and/or the like) segment types that the document segmentation machine learning model 405 is configured to identify. In some embodiments, the document segmentation machine learning model 405 is configured to select, for each segment type defined by the segment schema, a selected document subset of an input multi-segment document, where each document segment is associated with a corresponding segment type defined by the segment schema, and where each document segment is generated based at least in part on the selected document subset for the corresponding segment type that is associated with the document segment.

In some embodiments, given p multi-segment documents (e.g., given p multi-segment documents associated with a summarization profile, such asp multi-segment documents associated with a patient/member profile), each p multi-segment document may be used to generate n document segments associated with n segment types. This will generate n*p document segments that may be all stored in the storage subsystem 108 in association with the segment types and/or document identifiers associated with them.

For example, given b summarization profiles (e.g., given b patient/member profiles) each having p multi-segment documents, and given a segment schema identifying n segment types, b*p*n document segments may be generated, where each document segment is associated with one or more document segment identifiers, and where each document segment identifier for a document segment may be determined based at least in part on: (i) the summarization profile identifier for the summarization profile that is associated with the document segment, (ii) the multi-segment document identifier for the multi-segment document that is associated with the document segment, and (iii) the segment type identifier for the segment type that is associated with the document segment.

Trained document segmentation machine learning models can be used to determine document segments which in turn enable adaptive multi-segment summarization techniques. In some embodiments, the adaptive multi-segment summarization techniques introduced herein enable defining variable summarization density rates for different segments of a multi-segment documents. This enables reducing the size of summarization outputs by reducing the segment summaries for those segments having lower summarization density rates, which in turn decreases the size of data that needs to be transmitted from NLP server systems performing multi-segment document summarization to client computing entities and thus improves network transmission efficiency of NLP server systems. The adaptive multi-segment summarization techniques introduced herein enable using the summarization output data packet capacity more effectively to include more in-depth segment summaries for those segments having higher summarization density rates, which in turn increases network transmission throughput of NLP server systems that are configured to perform summarization on multi-segment documents. Accordingly, by disclosing adaptive multi-segment summarization techniques, various embodiments of the present invention address technical challenges associated with network transmission efficiency and network transmission throughput of NLP server systems. In doing so, various embodiments of the present invention make important technical contributions to the field of NLP.

Adaptive Multi-Segment Summarization

FIG. 5 is a flowchart diagram of an example process 500 for adaptive multi-segment summarization of one or more multi-segment documents that are associated with a segment schema. Via the various steps/operations of the process 500, the NLP computing entity 106 can generate segmentation of a multi-segment document to generate a summary of a corpus of multi-segment documents using a segment-discriminative approach to summarization density.

The process 500 begins at step/operation 501 when the NLP computing entity 106 identifies (e.g., receives from a client computing entity 102) a summarization query that can be used to identify the one or more multi-segment documents. For example, the summarization query may include a summarization profile identifier (e.g., a patient/member profile identifier) that can be used to identify all of the multi-segment documents that are associated with the summarization profile for the summarization profile identifier. In an exemplary embodiment, if the summarization query describes a patient/member profile identifier, all of the medical chart documents associated with the patient/member profile identifier may be retrieved/identified.

At step/operation 502, the NLP computing entity 106 generates, for each segment type of n segment types defined by the segment schema, an adaptive segment summary. The adaptive segment summary for a segment type may describe a summary of content data associated with the segment type that is summarized in accordance with segment-specific summarization density guidelines for the segment type. For example, if a first segment type is associated with first segment-specific summarization density guidelines that require more density intensive summarization of the content data associated with the segment type compared to second segment-specific summarization density guidelines of a second segment type, then the adaptive segment summary for the first segment type may have a smaller portion of the content data associated with the first segment type than the portion of the content data associated with the second segment type that is included in the adaptive summary of the second segment type.

In some embodiments, step/operation 502 may be performed in accordance with the process that is depicted in FIG. 6, which is a flowchart diagram of an example process for generating an adaptive segment summary for a particular segment type. The process that is depicted in FIG. 6 begins at step/operation 601 when the NLP computing entity 106 identifies a segment corpus for the particular segment type that comprises each document segment of the one or more multi-segment documents that is associated with the segment type. For example, given p multi-segment documents (e.g., given p multi-segment documents associated with a summarization profile, such asp multi-segment documents associated with a patient/member profile), where each multi-segment document comprises n document segments, then of a total of n*p document segments, the segment corpus for each segment type may comprise p of the n*p document segments, i.e., from each of the p multi-segment documents, one of the document segments of the multi-segment document that is deemed to be associated with the particular segment type.

At step/operation 602, the NLP computing entity 106 identifies a summarization density hyper-parameter for the particular segment type. The summarization density hyper-parameter may define a user-selected summarization density for summarizing content data associated with a corresponding segment type, such that content data for a segment type having a higher summarization density hyper-parameter may be more intensely summarized (e.g., a greater portion of the content data associated with the segment type will be excluded during summarization) than a segment type having a lower summarization density hyper-parameter. In some embodiments, each summarization density hyper-parameter for a segment type of the segment schema is defined by the summarization query and/or by another user-provided query.

For example, in some embodiments, if content data associated with a particular segment type is associated with u content units, then the number of content units included in the adaptive segment summary for the particular segment type may be determined based at least in part on u h (e.g., may be determined based at least in part on the floor and/or ceiling of u h), where h is the summarization density hyper-parameter for the particular segment type. In some embodiments, if content data associated with a particular segment type includes 100 content units (e.g., 100 defined linguistic units, such as 100 sentences), and if the particular segment type is associated with the summarization density hyper-parameter of 22 percent, then only 22 of the content units of the particular segment type may be included in the adaptive segment summary of the particular segment type.

At step/operation 603, the NLP computing entity 106 generates the adaptive segment summary for the particular segment type based at least in part on the segment corpus for the particular segment type and the summarization density hyper-parameter for the particular segment type. In some embodiments, generating the adaptive segment summary for a particular segment type comprises: (i) identifying one or more content units of the segment corpus for the particular segment type; (ii) for each content unit, determining a unit-wise significance score; (iii) determining a selected subset of the one or more content units having highest unit-wise significance scores, wherein: (a) a cardinality of the selected subset is determined based at least in part on a defined ratio of a count of the one or more content units, and (b) the defined ratio is determined based at least in part on the summarization density hyper-parameter for the particular segment type; and (iv) generating the adaptive segment summary based at least in part on the selected subset.

In some embodiments, step/operation 603 may be performed in accordance with the process that is depicted in FIG. 7, which is a flowchart diagram of an example process for generating the adaptive segment summary for a particular segment type based at least in part on the segment corpus for the particular segment type and the summarization density hyper-parameter for the particular segment type. The process that is depicted in FIG. 7 begins at step/operation 701 when the NLP computing entity 106 identifies a set of content units (e.g., a set of sentences, a set of words, a set of subsegments, and/or the like) of the segment corpus that is associated with the particular segment type.

At step/operation 702, the NLP computing entity 106 determines a unit-wise significance score for each content unit. The unit-wise significance score for a content unit in a segment corpus may describe a relative significance measure of the content unit to significance measures of other content units of the segment corpus. For example, the unit-wise significance score for a content unit. For example, if a sentence $S_1$ of a segment corpus is associated with a unit-wise significance score $SS_1$ that is larger than a unit-wise significance score $SS_2$ of a sentence $S_2$ of the segment corpus, then $S_1$ may be deemed to be more significant of a sentence than $S_2$. In some embodiments, the unit-wise significance score for a content unit in a segment corpus is determined based at least in part on a summarization query context for a summarization query. For example, if the summarization query context describes that the summarization query pertains to a diabetes-related analysis, then the unit-wise significance score for a content unit may describe a significance measure for the content unit with respect to diabetes.

In some embodiments, step/operation 702 may be performed in accordance with the process that is depicted in FIG. 8, which is a flowchart diagram of an example process for determining the unit-wise significance score for a particular content unit. The process that is depicted in FIG. 8 begins at step/operation 801 when the NLP computing entity 106 determines a summarization query context for a summarization query. The summarization query context may describe a subject matter of the summarization query, and may for example be inferred based at least in part on one or more fields of the summarization query. For example, in some embodiments, the summarization query context may be explicitly be defined by one or more fields of the summarization query. As another example, the summarization query context may be inferred based at least in part on a specialization of a query-initiating provider profile (e.g., a medical query-initiating provider profile) that is associated with the summarization query and is defined by one or more fields of the summarization query. As another example, the summarization query context may be inferred based at least in part on a current condition of the summarization profile that is associated with the summarization query and is defined by one or more fields of the summarization query.

In some embodiments, the summarization query context describes one or more summarization query context codes associated with the summarization query context. A summarization query context code may describe any code that describes at least a portion of a summarization query context for a summarization query. Examples of summarization query context codes include diagnosis codes, procedure codes, drug codes, and/or the like. For example, if a summarization query pertains to a diabetes-related analysis, then the summarization query context codes for the summarization query may comprise a diagnosis code for diabetes. As another example, if a summarization query pertains to an appendix removal surgery, then the summarization query context codes for the summarization query may comprise a procedure code for appendix removal surgery.

At step/operation 802, the NLP computing entity 106 determines a unit-wise contextual relevance score for the particular content unit based at least in part on the particular content unit and the summarization query context for the particular content unit. The unit-wise contextual relevance score for a content unit may describe a relative significance measure for the content unit with respect to other significance measures of other content units in the same segment corpus as the content unit, where the relative significance measure is determined with respect to a summarization query context for a summarization query. In some embodiments, determining the unit-wise contextual relevance score for the particular content unit comprises: determining one or more summarization query context codes associated with the summarization query context; and determining, using a content unit significance prediction machine learning model and based at least in part on the particular content unit and the one or more summarization query context codes, unit-wise contextual relevance score.

The content unit significance prediction machine learning model may be configured to process feature data associated with a content unit along with one or more summarization query context codes to determine an output that can be used to generate a unit-wise contextual relevance score for the content unit with respect to a summarization query context that is associated with the one or more summarization query context codes. For example, the content unit significance prediction machine learning model may be configured to process a sentence and a diagnosis code to generate an output that describes a predicted relevance measure for the sentence with respect to the diagnosis code. In some embodiments, given u sentences in a segment corpus, the predicted relevance measures for the u sentences may be normalized to generate the unit-wise contextual relevance scores for the u sentences. The u sentences can then be ranked in accordance with their unit-wise contextual relevance scores. In some embodiments, inputs to the content unit significance prediction machine learning model comprise: (i) one or more vectors describing feature data for an input content unit, and/or (ii) one or more vectors describing the one or more summarization query context codes. In some embodiments, outputs of the content unit significance prediction machine learning model may include an atomic value and/or a vector describing the predicted relevance measure for the input content unit with respect to the one or more summarization query context codes.

In some embodiments, the content unit significance prediction machine learning model is trained based at least in part on training data that is generated based at least in part on existing documents that are associated with summarization query context code. For example, in some embodiments, if a sentence appears in a document that has a particular summarization query context code (e.g., a particular diagnosis code), then a training entry is created that describes that there is an affirmative (e.g., one-valued) label for association of feature data associated with the sentence and the particular summarization query context code. For example, if sentence $S_3$ appears in a document that is associated with the diagnosis code $ICD_1$, then the training entry $\{S_3, ICD_3, 1\}$ may be generated.

At step/operation 803, the NLP computing entity 106 determines the unit-wise significance score for the particular content unit based at least in part on the unit-wise contextual relevance score for the particular content unit. As described above, in some embodiments, the unit-wise significance score for a content unit in a segment corpus is determined based at least in part on a summarization query context for a summarization query. For example, if the summarization query context describes that the summarization query pertains to a diabetes-related analysis, then the unit-wise significance score for a content unit may describe a significance measure for the content unit with respect to diabetes.

Returning to FIG. 7, at step/operation 703, the NLP computing entity 106 determines a selected subset of the one or more content units having highest unit-wise significance scores. In some embodiments, a cardinality of the selected subset is determined based at least in part on a defined ratio of a count of the one or more content units, and the defined ratio is determined based at least in part on the summarization density hyper-parameter for the particular segment type. For example, in some embodiments, if content data associated with a particular segment type is associated with u content units, then the number of content units included in the adaptive segment summary for the particular segment type may be determined based at least in part on u h (e.g., may be determined based at least in part on the floor and/or ceiling of u h), where h is the summarization density hyper-parameter for the particular segment type. In some embodiments, if content data associated with a particular segment type includes 100 content units (e.g., 100 defined linguistic units, such as 100 sentences), and if the particular segment type is associated with the summarization density hyper-parameter of 22 percent, then only 22 of the content units of the particular segment type may be included in the adaptive segment summary of the particular segment type.

At step/operation 704, the NLP computing entity 106 generates the adaptive segment summary for the particular segment type based at least in part on the selected subset. In some embodiments, the NLP computing entity 106 adopts the selected subset as the adaptive segment summary for the particular segment. In some embodiments, to generate the adaptive segment summary for the particular segment type, the NLP computing entity 106 performs one or more other NLP operations (e.g., one or more extractive summarization operations, one or more abstractive summarization operations, and/or the like) on textual data comprising the selected subset to generate an output that can be used to generate the adaptive segment summary for the particular segment type.

Returning to FIG. 5, at step/operation 503, the NLP computing entity 106 generates an adaptive multi-segment summary for the one or more multi-segment summaries based at least in part on each adaptive segment summary for a segment type. In some embodiments, the NLP computing entity 106 combines each adaptive segment summary for the n segment types to generate the adaptive multi-segment summary for the one or more multi-segment summaries. In some embodiments, the NLP computing entity 106 performs one or more other NLP operations (e.g., one or more extractive summarization operations, one or more abstractive summarization operations, and/or the like) on textual data comprising a combination of combines each adaptive segment summary for the n segment types to generate the adaptive multi-segment summary for the one or more multi-segment summaries.

Via step/operation 503, various embodiments of the present invention address technical challenges associated with network transmission efficiency and network transmission throughput of NLP server systems that are configured to perform summarization on multi-segment documents by disclosing adaptive multi-segment summarization techniques. For example, in some embodiments, the adaptive multi-segment summarization techniques introduced herein enable defining variable summarization density rates for different segments of a multi-segment documents. This enables reducing the size of summarization outputs by reducing the segment summaries for those segments having lower summarization density rates, which in turn decreases the size of data that needs to be transmitted from NLP server systems performing multi-segment document summarization to client computing entities and thus improves network transmission efficiency of NLP server systems. The adaptive multi-segment summarization techniques introduced herein enable using the summarization output data packet capacity more effectively to include more in-depth segment summaries for those segments having higher summarization density rates, which in turn increases network transmission throughput of NLP server systems that are configured to perform summarization on multi-segment documents. Accordingly, by disclosing adaptive multi-segment summarization techniques, various embodiments of the present invention address technical challenges associated with network transmission efficiency and network transmission throughput of NLP server systems. In doing so, various embodiments of the present invention make important technical contributions to the field of NLP.

At step/operation 504, the NLP computing entity 106 performs one or more summarization-based actions based at least in part on the adaptive multi-segment summary. For example, the NLP computing entity 106 may be configured to generate user interface data for a multi-segment summarization user interface that is configured to depict data associated with the adaptive multi-segment summary. An operational example of such a multi-segment summarization user interface 1000 is depicted in FIG. 10. As depicted in FIG. 10, the multi-segment summarization user interface 1000 depicts each segment corpus for n segment types while designating (with bounding boxes, such as bounding box 1001) those content units that fall within the adaptive multi-segment summary. The multi-segment summarization user interface 800 distinguishes each segment corpus for a different segment type with a distinctly-colored region.

In some embodiments, performing one or more summarization-based actions based at least in part on the adaptive multi-segment summary comprises: (i) processing the adaptive multi-segment summary using an NLP-based diagnosis prediction machine learning model to generate a diagnosis score with respect to a target condition, and (ii) in response to the diagnosis score satisfying (e.g., exceeding) a diagnosis score threshold, performing one or more diagnosis-based actions (e.g., scheduling one or more medical appointments, generating one or more medication prescriptions, performing one or more hospital server operational load balancing operations, and/or the like).

Guided Interaction with Multi-Segment Document

The identified document segments of a multi-segment document may enable guided interaction with (e.g., guided navigation of) the multi-segment document based at least in part on user-specified segmentation criteria. For example, in some embodiments, in response to a navigation query that requests access to a selected multi-segment document and a segment selection query that requests highlighting of a document segment of the selected multi-segment document that has a selected segment type, user interface data for a document interaction user interface that displays data associated with the selected multi-segment document while highlighting a portion of the data that is associated with the selected segment type is generated.

An operational example of a document interaction user interface 900 is depicted in FIG. 9. As depicted in FIG. 9, the document interaction user interface 900 displays data associated with a multi-segment document 902, while highlighting the document segment of the multi-segment document 902 that corresponding to the selected segment type 901 of the multi-segment document 902. The document interaction user interface 900 further enables searching the multi-segment document via the search panel 903.

In some embodiments, the NLP computing entity 106 enables access to a Chart Navigator. In some embodiments, Chart Navigator is a tool that allows the user to navigate a medical chart using the textual structure of that chart. The textual structure of the medical chart can be inherently presented in the chart, generated by the Chart Profiler, or generated by any other structuring approach. To illustrate how the Chart Navigator may operate, consider the following example: a chart reviewer wants to review a chart and wants to focus on a specific segment of the chart to make a decision. The reviewer opens the Chart Navigator and selects the patient or the chart they want to review. They can do the selection based at least in part on different criteria, such as, chart ID, patient ID, patient name, date of service, and/or the like. Once the desired chart is loaded, the Chart Navigator uses the structure of the chart to show the reviewer the available segments in that chart. The reviewer can then click on the segment they want to navigate. The Chart Navigator then uses the text of the selected segment to navigate through the segment in the chart's image. This tool may also in some embodiments highlight the selected segment in the image.

Accordingly, as described above, various embodiments of the present invention address technical challenges associated with network transmission efficiency and network transmission throughput of NLP server systems that are configured to perform summarization on multi-segment documents by disclosing adaptive multi-segment summarization techniques. For example, in some embodiments, the adaptive multi-segment summarization techniques introduced herein enable defining variable summarization density rates for different segments of a multi-segment documents. This enables reducing the size of summarization outputs by reducing the segment summaries for those segments having lower summarization density rates, which in turn decreases the size of data that needs to be transmitted from NLP server systems performing multi-segment document summarization to client computing entities and thus improves network transmission efficiency of NLP server systems. The adaptive multi-segment summarization techniques introduced herein enable using the summarization output data packet capacity more effectively to include more in-depth segment summaries for those segments having higher summarization density rates, which in turn increases network transmission throughput of NLP server systems that are configured to perform summarization on multi-segment documents. Accordingly, by disclosing adaptive multi-segment summarization techniques, various embodiments of the present invention address technical challenges associated with network transmission efficiency and network transmission throughput of NLP server systems. In doing so, various embodiments of the present invention make important technical contributions to the field of NLP.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
    identifying, by one or more processors, a plurality of segment types of a multi-segment document, wherein the plurality of segment types is defined by a segment schema;
    receiving, by the one or more processors and through a user interface, user input indicative of one or more user-selected summarization density preferences for summarizing content data associated with one or more segment types from the plurality of segment types based on a corresponding percentage;

modifying, by the one or more processors, a content unit significance prediction machine learning model based at least in part on a plurality of summarization density hyper-parameters corresponding to the one or more user-selected summarization density preferences, wherein the plurality of summarization density hyper-parameters respectively correspond to the plurality of segment types;

generating, by the one or more processors and using the content unit significance prediction machine learning model, a plurality of adaptive segment summaries for the plurality of segment types respectively based at least in part on the plurality of summarization density hyper-parameters; and providing, by the one or more processors, the plurality of adaptive segment summaries.

2. The computer-implemented method of claim 1, wherein generating an adaptive segment summary of the plurality of adaptive segment summaries comprises:

identifying, by the one or more processors, a plurality of content units of a segment corpus for a segment type;

generating, by the one or more processors and using the content unit significance prediction machine learning model, a unit-wise significance score for a content unit of the plurality of content units;

identifying, by the one or more processors, one or more content units from the plurality of content units that have one or more highest unit-wise significance scores, wherein: (i) a cardinality of the one or more content units is based at least in part on a defined ratio of a count of the plurality of content units, and (ii) the defined ratio is based at least in part on summarization density hyper-parameter corresponding to the segment type; and generating the adaptive segment summary based at least in part on the one or more content units.

3. The computer-implemented method of claim 2, wherein generating the unit-wise significance score comprises:

determining, by the one or more processors, a summarization query context for a summarization query;

generating, by the one or more processors and using the content unit significance prediction machine learning model, a unit-wise contextual relevance score for the content unit based at least in part on the content unit and the summarization query context; and generating, by the one or more processors, the unit-wise significance score based at least in part on the unit-wise contextual relevance score.

4. The computer-implemented method of claim 3, wherein generating the unit-wise contextual relevance score comprises:

determining, by the one or more processors, one or more summarization query context codes associated with the summarization query context; and generating, by the one or more processors and using the content unit significance prediction machine learning model, the unit-wise contextual relevance score based at least in part on the content unit and the one or more summarization query context codes.

5. The computer-implemented method of claim 1, wherein the multi-segment document is associated with a summarization profile that is defined by a summarization query, wherein the summarization query is indicative of (i) a summarization profile identifier, (ii) one or more segment types of the plurality of segment types defined by the segment schema, and (iii) one or more of the plurality of summarization density hyper-parameters for the plurality of segment types.

6. The computer-implemented method of claim 1, further comprising:

generating, by the one or more processors and using a document segmentation machine learning model, one or more document segments from the multi-segment document, wherein the document segmentation machine learning model is configured to select a document segment from the one or more document segments that corresponds to a segment type of the plurality of segment types; and generating, by the one or more processors, a segment corpus for the segment type based at least in part on the document segment.

7. The computer-implemented method of claim 1, further comprising:

identifying, by the one or more processors, a navigation query that describes the multi-segment document;

identifying, by the one or more processors, a segment selection query that describes a segment type of the plurality of segment types; and generating, by the one or more processors, user interface data for a document interaction user interface for the display of data associated with the multi-segment document while highlighting a portion of the data that is associated with the segment type.

8. A computing system comprising one or more processors and at least one memory including program code, the at least one memory and the program code configured to, with the one or more processors, cause the computing system to:

identify a plurality of segment types of a multi-segment document, wherein the plurality of segment types is defined by a segment schema;

receive, through a user interface, user input indicative of one or more user-selected summarization density preferences for summarizing content data associated with one or more segment types from the plurality of segment types based on a corresponding percentage;

modify a content unit significance prediction machine learning model based at least in part on a plurality of summarization density hyper-parameters corresponding to the one or more user-selected summarization density preferences, wherein the plurality of summarization density hyper-parameters respectively correspond to the plurality of segment types;

generate, using the content unit significance prediction machine learning model, a plurality of adaptive segment summaries for the plurality of segment types respectively based at least in part on the plurality of summarization density hyper-parameters; and provide the plurality of adaptive segment summaries.

9. The computer-implemented method of claim 1, wherein providing the plurality of adaptive segment summaries comprises:

initiating, by the one or more processors and through the user interface, a display of the plurality of adaptive segment summaries with an indication of a segment type of the plurality of segment types that corresponds to each of the plurality of adaptive segment summaries.

10. The computing system of claim 8, wherein generating an adaptive segment summary of the plurality of adaptive segment summaries comprises:

identifying a plurality of content units of a segment corpus for a segment type;

generating, using the content unit significance prediction machine learning model, a unit-wise significance score for a content unit of the plurality of content units;

identifying one or more content units from the plurality of content units that have one or more highest unit-wise significance scores, wherein: (i) a cardinality of the one or more content units is based at least in part on a defined ratio of a count of the plurality of content units, and (ii) the defined ratio is based at least in part on summarization density hyper-parameter corresponding to the segment type; and generating the adaptive segment summary based at least in part on the one or more content units.

11. The computing system of claim 10, wherein generating the unit-wise significance score comprises:
determining a summarization query context for a summarization query;
generating, using the content unit significance prediction machine learning model, a unit-wise contextual relevance score for the content unit based at least in part on the content unit and the summarization query context; and
generating the unit-wise significance score based at least in part on the unit-wise contextual relevance score.

12. The computing system of claim 11, wherein generating the unit-wise contextual relevance score comprises:
determining one or more summarization query context codes associated with the summarization query context; and
generating, using the content unit significance prediction machine learning model, the unit-wise contextual relevance score based on the content unit and the one or more summarization query context codes.

13. The computing system of claim 8, wherein the multi-segment document is associated with a summarization profile that is defined by a summarization query, wherein the summarization query is indicative of (i) a summarization profile identifier, (ii) one or more segment types of the plurality of segment types defined by the segment schema, and (iii) one or more of the plurality of summarization density hyper-parameters for the plurality of segment types.

14. The computing system of claim 8, further comprising:
generating, using a document segmentation machine learning model, one or more document segments from the multi-segment document, wherein the document segmentation machine learning model is configured to select a document segment from the one or more document segments that corresponds to a segment type of the plurality of segment types; and
generating a segment corpus for the segment type based at least in part on the document segment.

15. The computing system of claim 8, further configured to:
identify a navigation query that describes the multi-segment document;
identify a segment selection query that describes a segment type of the plurality of segment types; and
generate user interface data for a document interaction user interface that displays data associated with the multi-segment document while highlighting a portion of the data that is associated with the segment type.

16. A computer program product comprising at least one non-transitory computer-readable storage medium having computer-readable program code portions stored therein, the computer-readable program code portions configured to:

identify a plurality of segment types of a multi-segment document, wherein the plurality of segment types is defined by a segment schema;

receive, through a user interface, user input indicative of one or more user-selected summarization density preferences for summarizing content data associated with one or more segment types from the plurality of segment types based on a corresponding percentage;

modify a content unit significance prediction machine learning model based at least in part on a plurality of summarization density hyper-parameters corresponding to the one or more user-selected summarization density preferences, wherein the plurality of summarization density hyper-parameters respectively correspond to the plurality of segment types;

generate, using the content unit significance prediction machine learning model, a plurality of adaptive segment summaries for the plurality of segment types respectively based at least in part on the plurality of summarization density hyper-parameters; and provide the plurality of adaptive segment summaries.

17. The computer program product of claim 16, wherein generating an adaptive segment summary of the plurality of adaptive segment summaries comprises:
identifying a plurality of content units of a segment corpus for a segment type;
determining a unit-wise significance score for a content unit of the plurality of content units;
identifying one or more content units from the plurality of content units that have one or more highest unit-wise significance scores, wherein: (i) a cardinality of the one or more content units is based at least in part on a defined ratio of a count of the plurality of content units, and (ii) the defined ratio is based at least in part on summarization density hyper-parameter corresponding to the segment type; and
generating the adaptive segment summary based at least in part on the one or more content units.

18. The computer program product of claim 17, wherein generating the unit-wise significance score comprises:
determining a summarization query context for a summarization query;
generating, using the content unit significance prediction machine learning model, a unit-wise contextual relevance score for the content unit based at least in part on the content unit and the summarization query context; and
generating the unit-wise significance score based at least in part on the unit-wise contextual relevance score.

19. The computer program product of claim 18, wherein generating the unit-wise contextual relevance score comprises:
determining one or more summarization query context codes associated with the summarization query context; and
generating, using the content unit significance prediction machine learning model, the unit-wise contextual relevance score based on the content unit and the one or more summarization query context codes.

20. The computer program product of claim 16, further configured to:
identify a navigation query that describes the multi-segment document;
identify a segment selection query that describes a segment type of the plurality of segment types; and
generate user interface data for a document interaction user interface for the display of data associated with the multi-segment document while highlighting a portion of the data that is associated with the segment type.

* * * * *